Aug. 14, 1956                F. T. MOSER                 2,758,553
       APPARATUS FOR FORMING VARIEGATED INTERSPERSED
                    RIBBONS OF PLASTIC MATERIALS
                       Filed Jan. 4, 1955
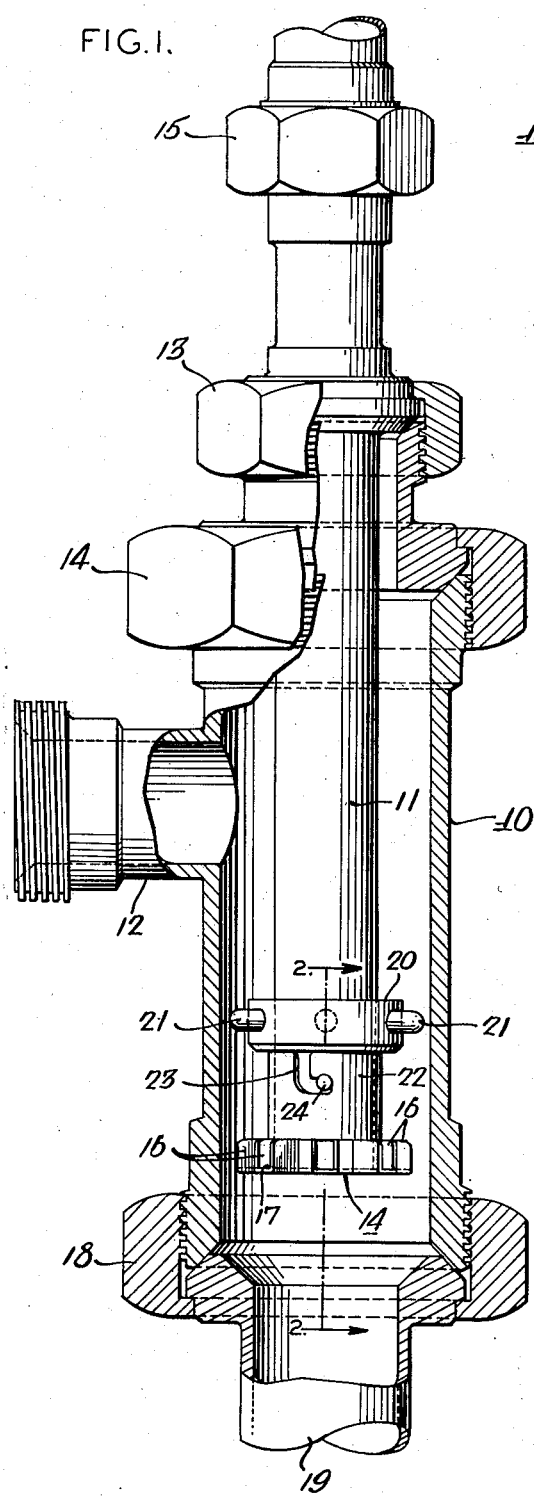
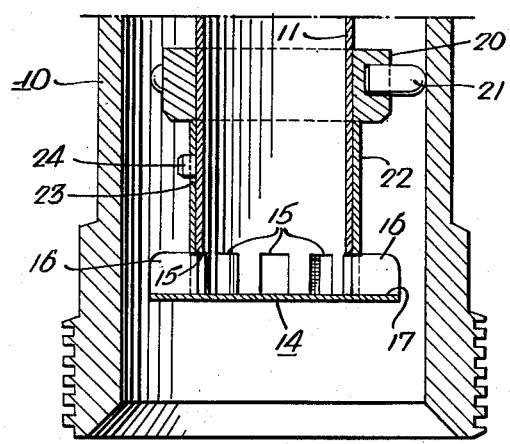
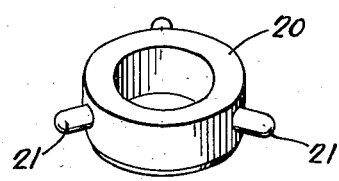
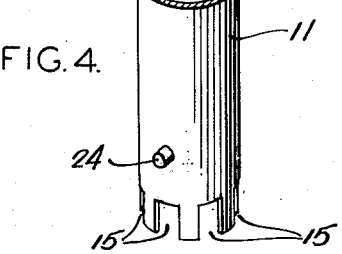
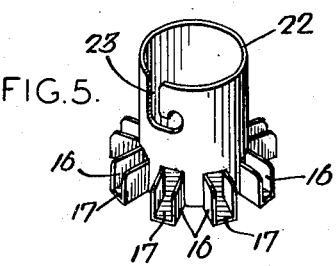
INVENTOR:
FRANK T. MOSER
BY
Howson & Howson
ATTYS.

United States Patent Office 2,758,553
Patented Aug. 14, 1956

2,758,553

APPARATUS FOR FORMING VARIEGATED INTERSPERSED RIBBONS OF PLASTIC MATERIALS

Frank T. Moser, Easton, Pa.

Application January 4, 1955, Serial No. 479,695

8 Claims. (Cl. 107—1)

This invention relates to a variegator, and was conceived and developed as an apparatus for incorporating within a matrix body of ice cream or other frozen confection a separate body of flavoring material in the form of a plurality of irregular masses or ribbons of such plastic flavoring material by injecting and dispersing it within the body of ice cream or the like. As an example of the product of such an apparatus, there may be cited the provision of interspersed chocolate flavoring sauce within a body of vanilla ice cream.

The accomplishment of a variegating operation of this nature has heretofore been achieved in a variety of ways, some involving batch operation and some performed during continuous flow of the materials. All such operations have, however, left something to be desired, either in simplicity and economy or in reliability of performance.

An object of this invention has been to provide an apparatus for this purpose which is extremely simple and economical to build and operate, and at the same time unusually reliable in accomplishment of the desired result.

A further object has been to provide an apparatus in which the variegation is achieved in a positive and direct manner, during continuous flow of the plastic matrix body and plastic flavoring sauce through the apparatus and process.

A further object of the invention has been to improve the reliability of the operation by projecting the sauce as a plurality of separate radially directed streams into an interior portion of the surrounding annular body of matrix material.

Still further objects and advantages and the manner in which they have been attained will be evident from reading the following detailed description in the light of the attached drawing, in which, Figure 1 is a view of the variegating apparatus of the invention, being partly in cross-section and partly in side elevation, Figure 2 is a detailed cross-section on the line 2—2 of Figure 1, and Figures 3, 4 and 5 are perspective views, respectively, of the three elements of Figures 1 and 2 at the lower, or discharge, end of the sauce feeding tube.

As illustrated in the drawing, the variegator of the invention comprises essentially an outer tubular conduit 10 constituting a source of feed of the plastic matrix of ice cream or the like, an inner tubular conduit 11 constituting the source of supply of the core of flavoring material sauce to be incorporated within the body of ice cream, and apparatus associated with these two conduits designed to produce the desired combination of these materials. It will be seen that the ice cream is received within an annular space between the inner circumference of the conduit 10 and the outer circumference of the conduit 11 and this ice cream may be fed into that space by any suitable means such as a feed device for passing it under pressure through the lateral extension 12 into this annular space. The conduits 10 and 11 may be interconnected through any suitable coupling connections such as those illustrated at 13 and 14, and the flavoring sauce may be fed under pressure as a core of material into the conduit 11 through a suitable pipe coupling connection 15.

By the combination of feed devices, couplings and conduits so provided, the annular ice cream matrix and the desired core of flavoring sauce are fed in a downward direction as illustrated and as the sauce approaches the lower or discharge end of the conduit 11 it is deflected by a deflector plate 14 which closes its lower end. However, this flavoring sauce is permitted to flow laterally from the lower end of tube 11 through outlets 15 provided in its circumferential wall just above, or up-stream from deflector plate 14. The sauce is directed and guided by laterally extending vanes 16 which produce a plurality of radially directed ribbons or streams of sauce material, as this material leaves the lower end of tube 11. These vanes are interconnected at their lower ends by plates 17, so that they constitute, in effect, a plurality of separate troughs by which the sauce is projected in a number of radially directed streams into an intermediate portion of the flowing matrix of ice cream. Upon discharge from the troughs so provided, the sauce will be distributed within the interior portion of the ice cream annulus in the form of ribbons, which are given the desired irregular effect, both because of the stresses and frictional forces involved in the feeding and combining of these materials, and because of their further feed together through pipe coupling 18 and discharge conduit 19.

In the preferred practice of the invention, the tube 11 is maintained in accurately spaced relationship concentrically within the tube 10 by means of a spacer ring 20 snugly surrounding the conduit 11 and provided with radially extending pins 21 which contact the inner circumference of the conduit 10 to locate the conduit 11 exactly as desired, without seriously interfering with the flow of the ice cream through the annular space between these conduits. The positioning ring 20 is maintained in place as illustrated by providing a tube 22 which is secured in position surrounding conduit 11 with its upper end abutting the lower end of ring 20. The tube 22 is secured to conduit 11 through a bayonet slot 23 at the upper end of tube 22 which coacts with a pin 24 on the exterior of conduit 11 to provide the bayonet joint.

From the foregoing discussion, it will be evident that I have provided an apparatus which is very simple and inexpensive both in regard to equipment involved and cost of operation, and that the incorporation of the interspersed material such as sauce or flavoring within the matrix body such as ice cream is accomplished directly and without any chance of erratic operation. It will also be evident that another important advantage is attained in that the apparatus can be very simply assembled and disassembled for cleaning or other purposes.

While only a single specific embodiment of the invention has been illustrated and described, it will be evident to those skilled in the art that variations and improvements are available within its broad scope, and I do not, therefore, intend to be limited in interpretation, except by the scope of the following claims.

I claim:

1. In a variegating apparatus for interspersing viscous ribbons of plastic fluid material in a matrix body of another plastic fluid material, the combination comprising a pair of conduits secured together in relative positions in which one of said conduits surrounds the other in spaced relation to its outer wall, means for interconnecting the inner conduit to a source of supply under pressure for feeding a core of the plastic fluid to form the ribbons longitudinally therethrough, means for connecting the space between said conduits to a source of supply under pressure of the plastic matrix material to form a flowing annular body into which said first-mentioned plastic fluid is to be interspersed, a deflector plate extending across the discharge end of said inner conduit, said inner conduit having a series of troughs extending laterally therefrom communicating with circumferentially spaced outlets through the adjacent circumferential wall of said inner conduit to direct material of said plastic fluid core in a plurality separate streams into the surrounding path of said flowing matrix material.

2. In a variegating apparatus for interspersing viscous ribbons of plastic fluid material in a matrix body of another plastic fluid material, the combination comprising a pair of conduits secured together in relative positions in which one of said conduits surrounds the other in spaced relation to its outer wall, means for interconnecting the inner conduit to a source of supply under pressure for feeding a core of the plactic fluid to form the ribbons longitudinally therethrough, means for connecting the space between said conduits to a source of supply under pressure of the plastic matrix material to form a flowing annular body into which said first-mentioned plastic fluid is to be interspersed, a deflector plate extending across the discharge end of said inner conduit, said inner conduit having a series of circumferentially spaced and outwardly extending troughs communicating with circumferentially spaced outlets through the adjacent circumferential wall of said inner conduit to direct material of said plastic fluid core in a plurality separated streams into the surrounding path of said flowing matrix material.

3. In a variegating apparatus for interspersing viscous ribbons of plastic fluid material in a matrix body of another plastic fluid material, the combination comprising a pair of conduits secured together in relative positions in which one of said conduits surrounds the other in spaced relation to its outer wall, means for interconnecting the inner conduit to a source of supply under pressure for feeding a core of the plastic fluid to form the ribbons longitudinally therethrough, means for connecting the space between said conduits to a source of supply under pressure of the plastic matrix material to form a flowing annular body into which said first-mentioned plastic fluid is to be interspersed, a deflector plate extending across the discharge end of said inner conduit, said inner conduit having a series of circumferentially spaced outlets directly above said deflector plate, each of said outlets having a trough in open communication therewith extending outwardly from said conduit to direct material of said plastic fluid core in a plurality separate streams into the surrounding path of said flowing matrix material.

4. In a variegating apparatus for interspersing viscous ribbons of plastic fluid material in a matrix body of another plastic fluid material, the combination comprising a pair of conduits secured together in relative positions in which one of said conduits surrounds the other is spaced relation to its outer wall, means for interconnecting the inner conduit to a source of supply under pressure for feeding a core of the plastic fluid to form the ribbons longitudinally therethrough, means for connecting the space between said conduits to a source of supply under pressure of the plastic matrix material to form a flowing annular body into which said first-mentioned plastic fluid is to be interspersed, a deflector plate extending across the discharge end of said inner conduit, said inner conduit having a series of circumferentially spaced outlets directly above said deflector plate, each of said outlets having a trough in open communication therewith extending radially outwardly from said conduit to direct material of said plastic fluid core in a plurality separated streams into the surrounding path of said flowing matrix material.

5. In a variegating apparatus for interspersing viscous ribbons of plastic fluid material in a matrix body of another plastic fluid material, the combination comprising a pair of conduits secured together in relative positions in which one of said conduits surrounds the other in spaced relation to its outer wall, means for interconnecting the inner conduit to a source of supply under pressure for feeding a core of the plastic fluid to form the ribbons longitudinally therethrough, means for connecting the space between said conduits to a source of supply under pressure of the plastic matrix material to form a flowing annular body into which said first-mentioned plastic fluid is to be interspersed, a deflector plate extending across the discharge end of said inner conduit, and laterally extending troughs mounted exteriorly of said inner conduit for receiving material deflected by said deflector plate, said troughs communicating with circumferentially spaced outlets through the adjacent circumferential wall of said inner conduit to direct material of said plastic fluid core in a plurality separated streams into the surrounding path of said flowing matrix material, said troughs having their bottoms in substantially the same horizontal plane as said deflector plate and having vertically upstanding sides extending to the height of said outlets.

6. In a variegating apparatus, the combination comprising a pair of conduits secured together in relative positions in which one of said conduits surrounds the other in spaced relation to its outer wall, a spacer ring surrounding the inner conduit and having circumferentially spaced projections extending into contact with the inner circumference of the outer conduit to position the inner conduit relatively with respect to the outer conduit, and a sleeve telescoped over the inner conduit and interconnected therewith through a bayonet slot and supporting said spacer ring in operative position surrounding said inner conduit.

7. A variegating apparatus as defined in claim 6, in which the lower end of said sleeve is provided with channels directing material passed therethrough laterally across the space between inner and outer conduits.

8. In a variegating apparatus, the combination comprising a pair of conduits secured together in relative positions in which one of said conduits surrounds the other in spaced relation to its outer wall, a spacer ring surrounding said inner conduit and having circumferentially spaced projections extending into contact with the inner surface of said outer conduit to position said inner conduit in a fixed spaced relation to said outer conduit, said inner conduit consisting of a tubular member open at the bottom and having a series of circumferentially spaced outlets adjacent its lower end and an outer sleeve member telescoped over said lower end, said sleeve member having its lower end closed by a deflector plate and having a series of spaced outlets corresponding to the outlets in said tubular member, each outlet of said sleeve member being provided with a laterally extending open-top trough that terminates in the space between said inner and outer conduits.

References Cited in the file of this patent
UNITED STATES PATENTS

| | | |
|---|---|---|
| 2,284,651 | Gundlach et al. | June 2, 1942 |
| 2,313,060 | Friedman | Mar. 9, 1943 |
| 2,389,084 | Routh | Nov. 13, 1945 |
| 2,666,397 | Skok | Jan. 19, 1954 |